July 13, 1943.  F. M. SMITH  2,324,435
METHOD OF MAKING FLANGED ELEMENTS
Filed Sept. 15, 1941  3 Sheets-Sheet 1
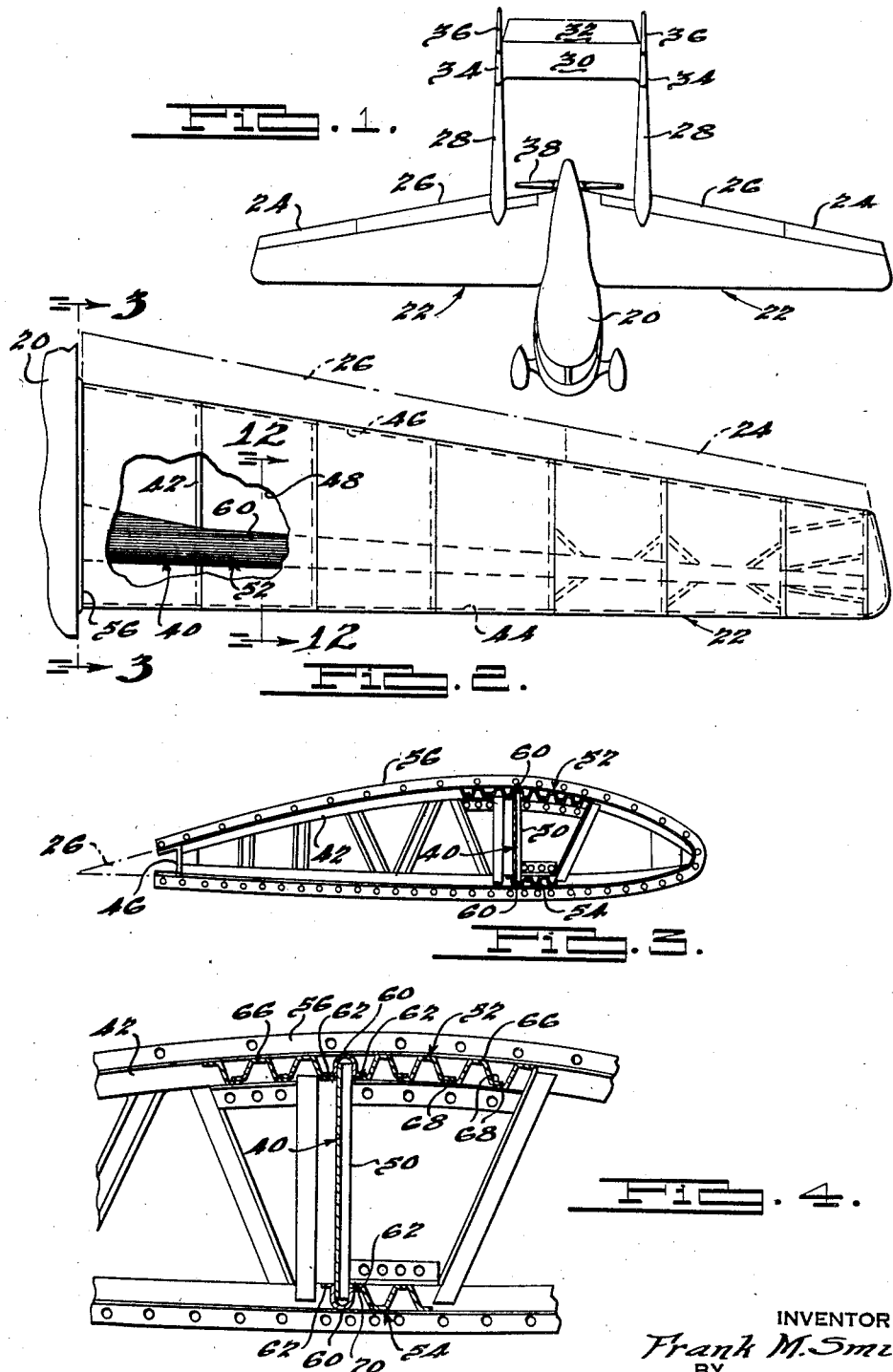
INVENTOR
Frank M. Smith.
BY Harness, Dickey & Pierce.
ATTORNEYS.

July 13, 1943.　　　　F. M. SMITH　　　　2,324,435
METHOD OF MAKING FLANGED ELEMENTS
Filed Sept. 15, 1941　　　3 Sheets-Sheet 2
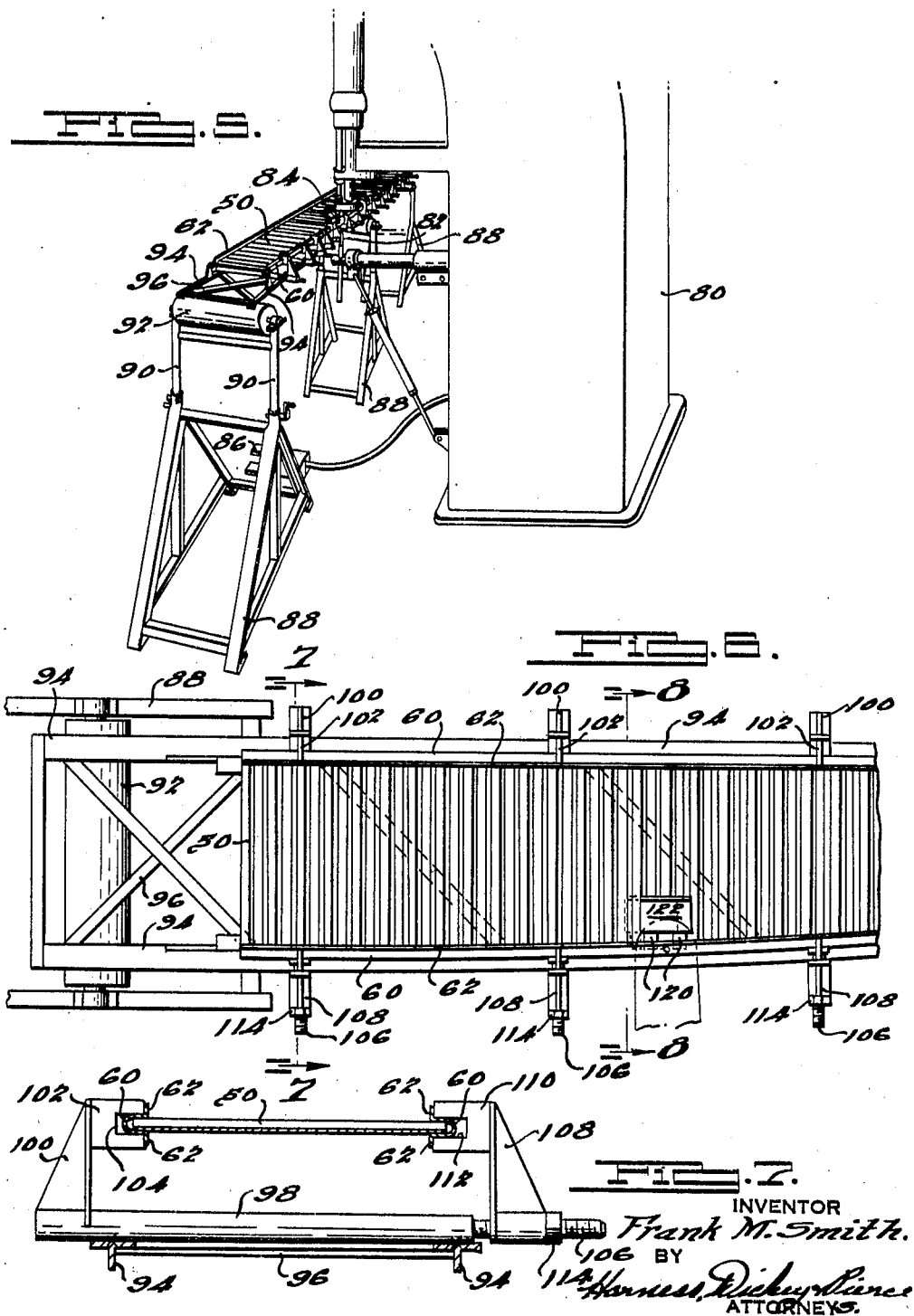
INVENTOR
Frank M. Smith.
BY
ATTORNEYS.

July 13, 1943.   F. M. SMITH   2,324,435
METHOD OF MAKING FLANGED ELEMENTS
Filed Sept. 15, 1941   3 Sheets-Sheet 3
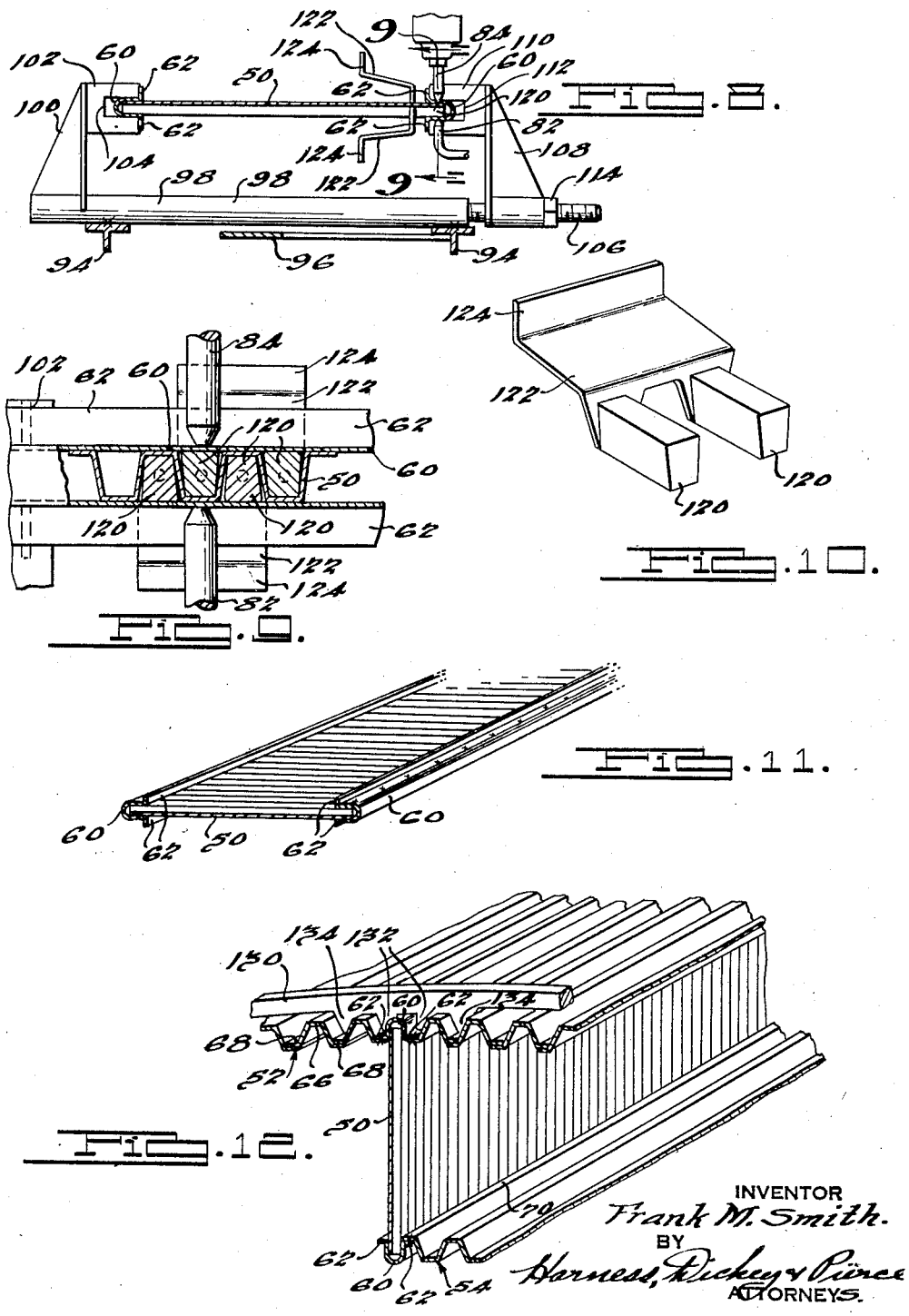

Patented July 13, 1943

2,324,435

UNITED STATES PATENT OFFICE 2,324,435

METHOD OF MAKING FLANGED ELEMENTS

Frank M. Smith, Dearborn, Mich., assignor, by mesne assignments, to Consolidated Aircraft Corporation, San Diego, Calif.

Application September 15, 1941, Serial No. 410,858

1 Claim. (Cl. 219—10)

This invention relates to the manufacturing of flanged elements and particularly to flanged elements formed from corrugated sheet metal, the principal object being the provision of a simplified method of producing such elements as well as to apparatus for carrying out such method.

Objects of the invention include the provision of a method of making a structural or other element having cooperating flange, or web and flange portions arranged in planes disposed angularly with respect to each other and in which at least one of the elements is formed from corrugated sheet metal with the corrugations thereof extending transversely to the length of the element, the method including the steps of enclosing the corrugated marginal edge portion of the corrugated element in a cap member having an outwardly directed flange, fixing the cap member thereto, and then fixing a flange portion of the element to the flange of the cap member; the provision of a method of making a structural or other element as above described in which the cap member is provided with oppositely directed flanges and a flange portion for the element is secured to each of the flanges, such flange portions being arranged in oppositely directed relation with respect to the corrugated portion; the provision of a method of making a structural element as above described in which the cap member is secured to the corrugated member by a welding operation; the provision of a method as above described in which the welding operation is accomplished by a pair of relatively movable electrodes disposed on opposite sides of the cap member; the provision of a method as above described in which non-weldable conducting fingers or plugs are inserted in supporting relation between the bottom of each corrugation and the cap member in the area being welded whereby to prevent crushing of the corrugated margin of the corrugated portion and the cap member during the welding operation and to provide an electrode for use therein; and the provision of a method of making a structural or other element as above described in which the cap member is assembled over the margin of the corrugated member an assembly including a plurality of interconnected copper fingers or plugs is arranged with the fingers or plugs inserted in the corrugations on each side of the corrugated member between the corrugated member and the corresponding side of the cap member, the assembly of the corrugated member and the cap member being passed between a pair of electrodes and the electrodes being operated to press against the opposite sides of the cap member in line with each high point of the corrugations on the corrugated members whereby to weld the cap member to the high point of each corrugation, the finger or plug assemblies being shifted longitudinally of the element as the welding operation proceeds so as to serve as an auxiliary electrode and to support the cap and corrugated member against crushing between the electrodes.

The above being among the objects of the present invention the same consists in certain novel steps of operation, features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is a more or less diagrammatic plan view of an airplane;

Fig. 2 is an enlarged, partially broken, plan view of one of the wings of the airplane shown in Fig. 1;

Fig. 3 is an enlarged, transverse sectional view taken on the line 3—3 of Fig. 2;

Fig. 4 is an enlarged, fragmentary, vertical sectional view of the airplane wing shown in Fig. 2 and taken as on the line 3—3 thereof illustrating the construction of the wing spar in greater detail;

Fig. 5 is a fragmentary perspective view illustrating the welding machine and accompanying apparatus employed for welding the cap members to the opposite margins of the web of the spar shown in Figs. 2, 3 and 4;

Fig. 6 is an enlarged, fragmentary, plan view of a portion of the welding jig shown in Fig. 5;

Fig. 7 is an enlarged transverse sectional view taken on the line 7—7 of Fig. 6;

Fig. 8 is a fragmentary transverse sectional view taken on the line 8—8 of Fig. 6;

Fig. 9 is an enlarged fragmentary, vertical sectional view taken on the line 9—9 of Fig. 8;

Fig. 10 is an enlarged perspective view of one of the finger or plug assemblies employed in the welding operation shown in the preceding views;

Fig. 11 is a fragmentary, perspective view of the completed web member with the cap members secured to the opposite margins thereof; and, Fig. 12 is a fragmentary, perspective view of the completed spar member, showing the same in section as taken on the line 12—12 of Fig. 2, and illustrating a preferred form of gauging or locating means employed in connection with the welding of the flanges to the web of the spar to properly locate one with respect to the other.

While the present invention is adaptable for use in the formation of structural or other elements having cooperating flanges or cooperating flanges and webs arranged at an angle to each other and formed from sheet metal, such for instance as angles, channels, I-beams and the like, it was primarily developed for and is particularly adaptable for the manufacture of airplane wing spars of the type described and claimed in my co-pending application for Letters Patent of the United States for improvements in Spar structure for airplane wings, filed May 9, 1941, and serially numbered 392,679. For this reason the description of the present invention will be limited to such spar construction, and its application to other elements of this general class will thereby be made apparent to those skilled in the art. The spar shown in said prior application is generally of channel section except that over a portion thereof one of the flanges is extended to the opposite side of the web so as to impart to it a partially channel and partially T-section. The web portion is formed from relatively thin sheet metal and corrugated in a direction transverse of its length over its entire length, this being one of the distinguishing features of the present invention. Although in the broader aspects of the invention the flanges may or may not be of a corrugated nature, in the particular spar structure shown in my co-pending application above identified the flanges are also formed of sheet metal and are corrugated in the direction of their length.

It will be appreciated that a problem is presented in securing two relatively flat metal sheet metal members together in angular relationship where at least one of such members is corrugated transversely of its length, and the method of and means for effecting such securement constitutes the gist of the present invention. In accordance with the present invention such securement is accomplished by forming a relatively shallow channel sectioned member from sheet metal and preferably of a length commensurate with the side edge of the corrugated members. This channel sectioned member which I prefer to term a cap member is of a width between the walls of the channel equal to the thickness of the corrugated margin of the corrugated sheet and is provided with an outwardly directed flange along at least one side of the open edge of the channel thereof. This cap member is placed over the corrugated edge of the corrugated member so as to embrace such margin therein and it is then fixed to such corrugated member in any suitable way. In other words it may be riveted or welded in place but where the sheet metal members are formed from steel, or from stainless steel as is preferable in connection with the wing spar disclosed in my prior application above identified, the securement is effecting by welding. Where the members are formed from a metal not readily weldable or at least not readily spot weldable, then riveting to the like may be resorted to. After such cap member is fixed to the corrugated marginal edge of the corrugated member, then a flange member is fixed to the corresponding outstanding flange of the cap member and, as in the case of fastening the cap member to the corrugated member, this may be accomplished by riveting, welding or the like. It will also be appreciated that where the final element is to be of T-section, then a cap member is necessary along one edge only of the transversely corrugated member unless it is desired to stiffen the opposite edge by the application of a cap member thereto. In an I-beam or channel sectioned element a cap member must be applied to both corrugated edges of the transversely corrugated member.

In fabricating a structural or like element in the manner described it will be appreciated that the cap member being of relatively small size makes it possible to secure it over the corrugated margin of the corrugated member as the ultimate flanges of the element are not present at that time to offer any obstruction to the placement of suitable riveting, welding or other equipment. Once the cap member has been secured in place, then the ultimate flange member or members of the element may be readily secured to the flange or flanges of the cap member or members by either a simple riveting or welding operation which in itself offers no particular difficulty.

Referring now to the accompanying drawings and particularly to Fig. 1, an airplane is shown including a fuselage 20 provided with a pair of wings indicated generally at 22 each provided with an aileron 24 and a flap 26 hingedly secured to its trailing edge in a conventional manner. A pair of booms 28 extend rearwardly in spaced relation from the wings 22 and carry a stabilizer 30, an elevator 32, a pair of fins 34 and a pair of rudders 36. The propeller 38 is carried at the rear end of the fuselage 20 between the booms 28 as indicated.

Referring now to Fig. 2 each wing 22 will be seen to include a single main spar indicated generally at 40 extending spanwise of the wing and to which is fixed a plurality of ribs 42 extending transversely with respect to the length of the spar. The ribs 42 at their forward ends are connected together by a spanwise extending member 44 and their rear or trailing ends are connected together by a spanwise extending member 46. Preferably a sheet metal covering 48 envelops the spar 40, ribs 42 and members 44 and 46, the covering 48 being made up of sheets extending transversely with respect to the spanwise length of the wing and being overlapped in line with each rib 42 and secured to such ribs.

The wing spar 40 as best illustrated in section in Figs. 3 and 4 includes a web member 50, a top flange indicated generally at 52 which projects on both sides of the web member 50 and a bottom flange indicated generally at 54. As best brought out in Fig. 2 the top flange 52 is of greatest width at the root end of the wing where it is attached to the fuselage 20 and at which point the wing is provided with an outwardly directed apertured flange 56 extending around its periphery as a means for securement of the wing to the fuselage. The upper flange 52 on the rear side of the web 50 decreases in width to the first rib 42 and then extends over the remaining length of the spar 40 at a relatively narrow width. That portion of the flange 52 forwardly of the web 50 gradually decreases in width from the root end of the spar to the tip end thereof as indicated best in Fig. 2.

In accordance with the present invention the web 50, as probably best brought out in Figs. 11 and 12, is formed from relatively thin sheet metal and is corrugated over its entire length, the corrugations extending transversely of its length. While the flanges 52 and 54 may be perfectly flat and either flanged or unflanged, in the construction shown by way of illustration they are both corrugated in the direction of their length, in other words the corrugations therein extend longitudinally of the spar or spanwise of the plane. In any event whether the flanges 52 and 54 are corrugated or not the principal problem presented in connection with a corrugated web of the type described is a satisfactory method of securing the flange members thereto.

In accordance with the present invention the flange members are secured to the corrugated web by securing a so-called cap member over a corrugated edge, or the corrugated edges, of the web 50, depending upon whether the element is to be of an L or T-section requiring but one cap member, or of a channel or I-beam section requiring two cap members, and then the flange members are secured to the cap member or members. The construction of the cap members are perhaps best brought out in Fig. 11 where each cap member is indicated generally at 60 and from which it will be noted that each comprises a strip of sheet metal bent into a U-section of a sufficient width between the interior walls thereof to closely receive the corresponding corrugated margins of the web 50 therein and to which it is suitably secured. Each cap member 60 is flanged at the open side of the channel thereof for reception of the flange member or members of the angular sectioned final element and it will be appreciated that where such element is to have a flange projecting in one direction only from the web 50 then one side only of each cap member 60 need be flanged, but where the flange of such element along one margin of the web 50 is to extend on both sides of the web 50 then the corresponding cap member 60 must be flanged on both sides thereof. The flanging of both sides of the cap member is preferable in any case inasmuch as in any event it aids in stiffening the ultimate element of which it forms a part. Accordingly, in the drawings each cap member 60 is shown as provided with an outwardly directed flange 62 at each side of the open side of the channel thereof. It will be appreciated that the cap members 60 do not need to be of very great depth in the direction of depth of the web 50 inasmuch as all that is required is that it be deep enough to receive the corrugated edge of the web 50 therein and permit rigid securement of one to the other. For this reason the channels of the cap members 60 may be relatively shallow.

Once the cap members 60 are secured to the web 50 in the manner illustrated in Fig. 11, then the flanges 52 and 54 may be secured to the cap members 60, the flanges being provided with a flat surface along one margin thereof to over or under-lie the corresponding flanges 62 of the cap member 60 for this purpose and regardless of the remaining contour or configuration of the flange members.

Even where the flange members 52 and 54 are corrugated longitudinally as illustrated they may be subject to different methods of fabrication. For instance, and as best illustrated in Fig. 12, the lower flange member 54 is illustrated as being formed from a single piece of sheet metal while the upper flange 52 is illustrated as being from a plurality of individual channel members 66 each having an outwardly directed flange 68 along the open edge of the channel, the various channel members 66 being assembled together with their flanges 68 overlapping each other as illustrated and the overlying flanges suitably secured together as by riveting, welding or the like until the full width of the flange member 52 has been built up. In such case the flange 68 on the inner side of the channel 66 next adjacent the web 50 is arranged in overlapping relationship with the corresponding flange 62 of the corresponding cap member 60 and is suitably secured thereto. The different forms of construction for the flanges 52 and 54 are shown merely by way of illustration as ordinarily it will be appreciated that the form of construction employed for the flange member 54 will be preferred. It will also be appreciated that where a construction equivalent to the construction of the flange member 54 is employed a laterally directed flange portion 70 is provided along that margin thereof which is to be next adjacent the web 50 so as to permit it to be arranged in overlapping relationship with respect to the cooperating flange 62 of the cooperating cap member 60 and secured thereto, as illustrated.

As previously mentioned although in the broader sense the spar 40 may be formed from any suitable sheet metal, under some circumstances it is preferably formed from stainless steel and preferably from stainless steel of the austenitic type which is difficult to work and particularly when in the form of relatively thin sheet metal as in the case under consideration it cannot be successfully subjected to drawing operations or the like. Parts made from such metal are preferably secured together by a welding operation and the manner in which this is effected forms a further part of the present invention.

In order to weld the cap members 60 to the web 50 apparatus of the type illustrated in Fig. 5 is preferably employed. As illustrated in Fig. 5 a conventional spot welding machine 80 is employed. It is provided with a vertically directed fixed electrode 82 and an aligned vertically movable electrode 84. A control 86 for the welding machine 80 is employed and positioned in a location convenient for operation by the operator of the welding machine, preferably on the floor in front of it as shown. The welding machine 80 is preferably that conventional type so constructed and arranged that operation of the control member 86 will cause the electrode 84 to approach the electrode 82 and securely clamp the parts to be welded therebetween, the electrical current being automatically caused to flow between the electrodes upon the building up of a predetermined clamping pressure between them. Seated on the floor in approximate transverse alignment with the electrodes 82 and 84 is a plurality of A-frames 88 each carrying a pair of vertically adjustable bars 90 at its upper end. Between the upper ends of each pair of bars 90 a roller 92 is rotatably mounted. Supported by the rollers 92 and slidable thereover is a welding jig having a main body portion comprising a pair of spaced approximately parallel T-bars 94 spaced from each other in acordance with the depth of the web 50 from end to end. In this respect it will be appreciated that in most airplane wing spars and in the case of the wing spar 40 shown the web 50 is of a greater depth at the root end of the wing than at the tip of the wing and the spacing of the T-bar 94 is varied to correspond therewith.

The T-bars 94 are rigidly connected together by metal lattice members 96 into a relatively rigid frame-like structure. At intervals over the length of the framework thus formed transversely extending metal tubes 98 are welded to the upper faces of the T-bars 94. To one end of each of the tubes 98 an upstanding bracket 100 is suitably fixed thereto as by welding or the like and to the upper end of each bracket 100 an inwardly projecting block 102 is fixed as by welding or the like. The blocks 102 are provided with a notch 104 therein, such notch being of a width corresponding with the thickness of the cap member 60 which is adapted to be received therein with the flanges 62 of the cap member abutting against inner end faces of the block 102 on each side of the notch 104 therein as best illustrated in Fig. 7.

The opposite end of each tube 98 has one end of a stud 106 fixed therein as also best illustrated in Fig. 7. Slidably mounted upon each stud 106 is a bracket 108 similar to the bracket 100 and like the bracket 100 carrying a head 110 substantially identical to the head 102 and arranged with the notch 112 thereof in opposed relation with respect to the notch 104. The two blocks 102 and 110 associated with each tube 98 arranged at the same height so that when the web 50 is provided with a cap member 60 on each edge thereof received in the notches 104 and 112 of the blocks 102 and 110, respectively, the web 50 is supported in parallel relation with respect to the general plane of the frame comprising the T-bars 94 and lattice bars 96 and consequently when arranged on the rollers 92 as illustrated in Fig. 5 will be horizontally disposed. Each stud 106 is provided with a nut 114 threaded thereon so that tightening up of the nut 114 on its corresponding stud 106 will force the bracket 108 and block 110 inwardly towards the bracket 100 and block 102.

In operation the cap member 60 is applied to each corrugated edge of a web 50, the brackets 102 are backed off by loosening the corresponding nuts 114, one edge of the web 50 with the cap member 60 thereon is inserted in the notches 104 of the various blocks 102 and the opposite edge of the web with its corresponding cap member 60 is brought into alignment with the notches 112 of the blocks 100 and the brackets 108 are moved towards the brackets 100 by the nuts 114 so as to force the cap members firmly upon the opposite edges of the web 50 as well as to support the cap members 60 and web 50 in assembled relation as illustrated best in Figs. 8 and 9. The rollers 92 are so adjusted in height that the jig with the web and cap members assembled together thereon and supported thereby may be moved over the lower electrode 82 with the bottom surface of each cap member 60 in turn received in abutting relation thereon as indicated in Fig. 5. In order to insure the proper contact of the web and cap members with the lower electrode 82 the A-frames 88 are preferably arranged in spaced relation on either side of the welding machine 80 as shown so that if necessary the jig and the web and cap assembly thereon may spring slightly to insure proper contact with the lower electrode 82.

A spot weld is preferably provided between each side of the cap member 60 and the bottom wall of the channel of each corrugation which contacts it. As brought out in Fig. 9, it will be appreciated that under such circumstances when such desired point of spot weld is brought into alignment with the electrodes 82 and 84 a double thickness of metal to be spot welded together exists on one side only of the cap member 60. Under such circumstances and particularly where the sheet metal from which the web 50 and cap member 60 is formed is relatively thin as in the case under consideration, it will be appreciated that unless otherwise prevented the pressure of the electrodes 82 and 84 on opposite sides of the cap member 60 might cause at least that portion of the cap member 60 overlying the open side of the corrugations then in line with the electrodes to be crushed inwardly. Furthermore, the welding current under such circumstances would have an imperfect path to flow between the electrodes and might result in an imperfect weld. In any event it would be extremely difficult to control the welds with any degree of certainty.

In order to overcome the possibility of the disadvantages above mentioned from occurring under such circumstances, the channel of the corrugations in line with the electrodes 82 and 84 during a welding operation is filled to its full depth with a finger or plug 120 made from copper. Under such circumstances the finger or plug member 120 in line with the electrodes 82 and 84 supports the opposite side walls of the cap member 60 against contraction to a thickness less than the thickness of the edge of the web 50 received therein, and thus prevents the sides of the cap member 60 from collapsing under the pressure of the electrodes. Additionally, because the finger or plug is formed from copper it forms a direct path for the welding current to flow between the electrodes to effect a spot weld between the overlapped portions of the cap member 60 and web 50 in line with the electrodes and at the same time serves to directly transmit the clamping force between the two electrodes on the particular area to be spot welded. The finger or plug 120 being formed from copper and being of appreciable mass is not itself welded to either the cap member or to the web 50 during the flow of welding current therethrough.

As illustrated best in Fig. 10 in order to facilitate the manipulation of the fingers or plugs 120 they are preferably formed in groups rigidly connected together by means of a suitable supporting member such as 122. The member 122 is preferably formed from sheet metal and provided with an out-turned free marginal edge portion 124 to facilitate manipulation of the assembly by a workman. While any number of fingers or plugs 120 may thus be assembled together into a single unit or assembly, the particular arrangement shown in drawings, and best in Fig. 10, by way of illustration includes but two fingers or plugs 120. It will, of course, be understood that two of such plug or finger units or assemblies are employed, one above the web 50 and one below it as indicated in Figs. 8 and 9. Where such assemblies each having two fingers or plugs 120 are employed it will be appreciated that a jig such as illustrated in Fig. 5 carrying a web and a cap member may be moved to four different positions of spot welding on the rollers 92 before it is necessary to remove the plug assemblies and replace them further along the web 50 for a continuance of the welding operation.

Ordinarily, in employing apparatus of the type illustrated in Fig. 5, the welding of the cap members 60 to the web 50 will begin at one end of the web 50 and continue by effecting a spot weld between the bottom of the channel of each corrugation and the side wall of the cap member 60 until the web 50 and the cap member 60 have been welded together throughout their entire length. Should the blocks 110 of the clamping brackets 108 interfere with the welding operation at any particular point, the nut 114 of such bracket 108 may be temporarily loosened and the bracket 108 moved out of position until the welding operation is completed, after which it may be returned to its original supporting and clamping position.

During the welding operation the welding jig with the web 50 and cap member or members 60 thereon is, of course, moved longitudinally thereof with the electrodes 82 and 84 moving relatively adjacent between each pair of brackets 108 and the corresponding blocks 110, but in changing from the space between one pair of such brackets to the next pair of such brackets the welding jig and the web assembly carried by it is slid outwardly on the rollers 92 until the interfering bracket 108 and block 110 clears the electrodes and it is then moved back into welding position with such bracket on the opposite side of the electrodes and the welding operation is continued until the next bracket is reached when the above described operation is repeated. Where two cap members 60 are employed as illustrated, one of such cap members is first welded to its corresponding edge of the web 50 and the entire jig and web assembly is then lifted from the rollers 92, turned end for end and the opposite cap member 60 is then welded to its corresponding edge of the web 50.

After the web 50 and the cap members 60 have been secured together as above described, then the flanges 52 and 54 may be applied thereto to form the completed spar. The flange 52 as previously explained originally is made up as two separate flange members one for each side of the web 50 and the flanged edge of each such flange member is arranged in overlapping relation with respect to the corresponding flange 62 of the associated cap member 60, and such overlapping flanges are then secured together. Likewise the flange 54 is applied to the web 50 by arranging its flange 70 in overlapping relation with respect to the corresponding flange 62 of the associated cap members 60 and such overlapping flanges are suitably secured together. As in the case of the web 50 and cap member 60, where the flange members are formed from a spot weldable material then the same welding machine 80 as illustrated in Fig. 5 may be employed to weld the overlapping flanges together, this being a relatively simple and conventional operation inasmuch as it involves only the welding together of flat overlapping parts.

It is desirable, however, in welding the flange members to the web that some means be provided for properly gauging the relative position of the flange members and cooperating cap member, and while it may be done in any suitable way a simple and suitable means for effecting this result is illustrated in Fig. 12. This comprises a bar 130 having a pair of downwardly projecting central tooth portions 132 arranged in spaced relation with respect to each other longitudinally of the bar 130, and in spaced relation outwardly of each tooth 132 an additional downwardly projecting tooth 134 is provided. The two teeth 132 are spaced from each other an amount equal to the width of the channel member 60 so as to enable it to be received therebetween, and their outer edges are shaped to fit the sides of the first corrugation of the individual members of the flange 52 at the desired spacing thereof with respect to the cap member 60. The teeth 134 are shaped to fit between adjacent corrugations of the individual members of the flange 52. When employing the member 130 one of the flange members is applied to the associated cap 60, the member 130 is applied as illustrated in Fig. 12 so as to properly locate the flange member with respect to the cap member 60, and then the overlapping flange portions of these members are secured together. Obviously a plurality of gauge members such as 130 may be employed during the operation. The same general procedure is, of course, followed in applying the remaining member of the flange 52, and in applying the flange 54.

Having thus described my invention what I claim by Letters Patent is:

In the manufacture of a sheet metal structural element having a web corrugated completely across the width of the same transversely of its length and a flange, the steps of forming a sheet metal channel-like cap member of a channel width to receive a corrugated edge of said web member therein and provided with an outwardly directed flange along one edge thereof arranged substantially in the plane of said flange of said element, inserting said corrugated edge of said web within said cap member, temporarily bracing said corrugated edge against crushing in the direction of its thickness, pressing said cap member between a pair of electrodes and passing a welding current therethrough to fix said cap member to said web, and then securing an edge of said flange of said element in overlapping relation with respect to said flange of said cap member.

FRANK M. SMITH.